Patented Aug. 10, 1926.

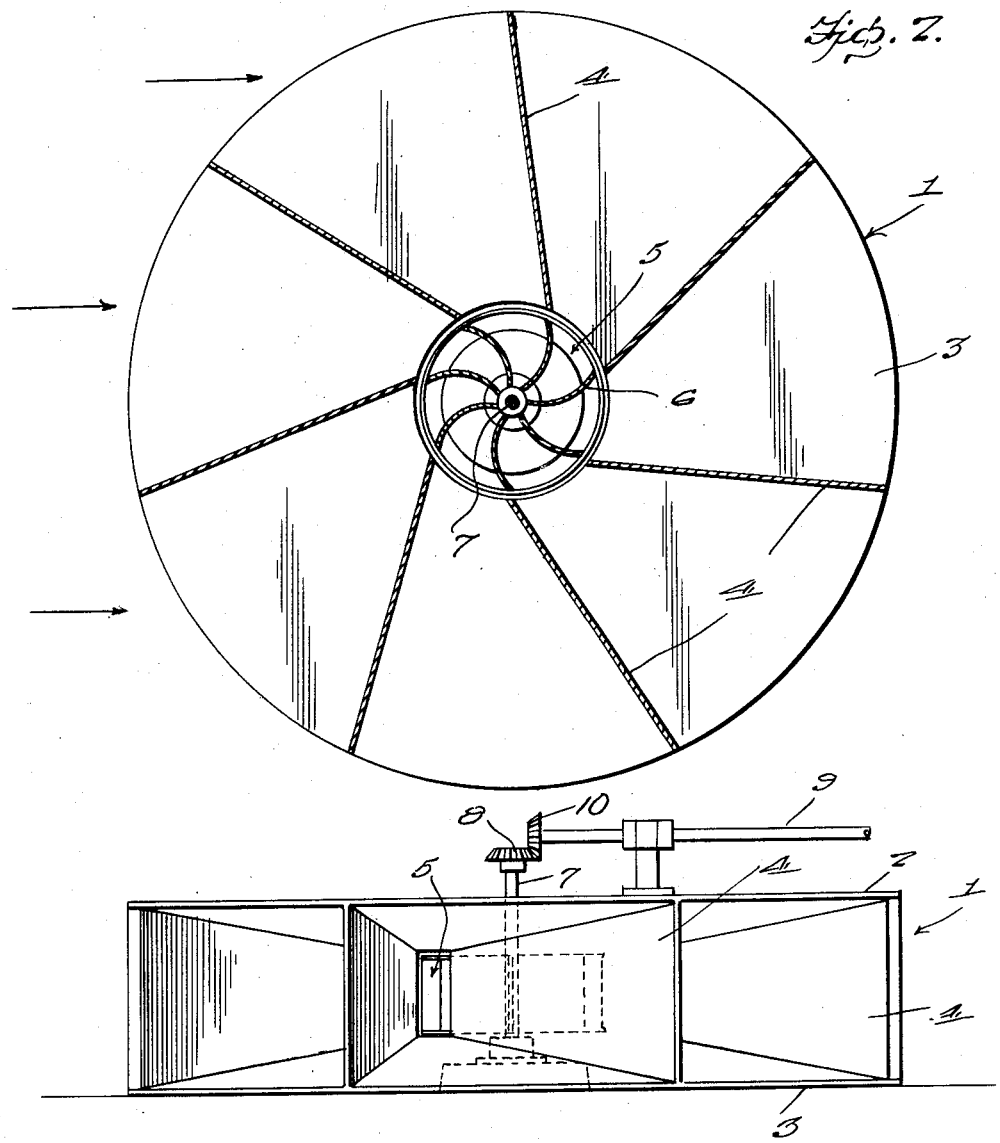

1,595,578

UNITED STATES PATENT OFFICE.

LEMORE G. SOVEREIGN, OF RUBY, NEBRASKA.

WIND CONCENTRATOR.

Application filed May 7, 1925. Serial No. 28,677.

This invention relates to an improved device for harnessing wind power and concentrating it upon a shaft operating rotor.

More particularly, the invention has reference to a casing embodying vertical partition walls arranged in inwardly diverging relation to provide circumferentially spaced V-pockets in which the wind is collected and concentrated to be forcibly guided against the blades of a rotor located at the inner open ends of the pockets.

Other features and advantages of the improved invention will become apparent from the following description and drawings.

In the accompanying drawings, forming a part of this application, and in which like numerals are employed to designate like parts throughout the same:

Figure 1 is an elevation of a device, constructed in accordance with the present invention.

Figure 2 is a central horizontal section through the same.

As before broadly indicated, the main feature of the invention is the casing 1. This casing embodies discular top and bottom walls 2 and 3 respectively. Arranged between these walls are circumferentially spaced vertically disposed partitions 4. In this connection, it should be noted from Figure 2, that the casing is provided at its center with an opening in which a rotary band 5 is located, this band having longitudinally curved impelling blades 6. It will be further noted that the top and bottom walls 2 and 3 incline toward each other in a direction from the periphery across said fan. It follows that the partitions 4 gradually decrease in height from their outer toward their inner ends. Under this arrangement, it will be seen that the casing embodies a plurality of substantially V-shaped pockets open at their outer and inner ends, and the inner open ends serving to concentrate the air currents against the blades 6 of the fan. The inclination of the partitions and top and bottom walls forming each pocket, serve to effectively concentrate the streams of air. By exerting this powerful concentrated stream of air against the blades of the fan, the latter, which is fastened to the vertical, rotary shaft, will serve to rapidly rotate this shaft. By providing the shaft with the beveled pinion 8, power can be taken off through the shaft 9, which is provided with a beveled pinion 10, meshing with the first named pinion.

From experience it has been observed, as indicated by the arrow in Figure 2, that, under ordinary conditions, the air simultaneously enters three of the pockets of the stationary casing, assuming that the wind is blowing in a direction from west to east. Under the annular arrangement of the pockets, however, the wind may be concentrated, regardless of the direction in which it is blowing. By thus harnessing and concentrating the wind upon the blades of the rotor, a source of unlimited power has been discovered for operating the power take-off shaft which may be in turn utilized for operating various farm machinery, saws and the like.

From the foregoing description and drawings, it will be observed that I have evolved and produced a novel structure for obtaining excellent results from wind power by concentrating it, regardless of direction of movement upon a rotor as described. It is thought that a consideration of the description, in connection with the drawings, will enable a clear understanding of the invention to be had, and for this reason a more lengthy description will not be entered.

While the preferred embodiment of the invention has been shown and described, it is to be understood that minor changes coming within the field of invention claimed, may be resorted to, if desired.

I claim:

In a wind concentrating device of the class described, an annular casing embodying top and bottom ring-like walls inclined toward each other in a direction toward the central axis of the casing, and a plurality of radiating circumferentially spaced partitions located between said top and bottom walls and forming a plurality of circumferentially disposed open ended V-shaped wind conducting and concentrating pockets, and a bladed rotor mounted for rotation in the open space at the center of the casing.

In testimony whereof I affix my signature.

LEMORE G. SOVEREIGN.